(12) United States Patent
Kwon et al.

(10) Patent No.: US 9,652,120 B2
(45) Date of Patent: May 16, 2017

(54) ELECTRONIC DEVICE AND METHOD FOR CONTROLLING A SCREEN

(71) Applicant: Samsung Electronics Co., Ltd., Gyeonggi-do (KR)

(72) Inventors: Hyun-Jung Kwon, Seoul (KR); Sung-Wang Kim, Seoul (KR); Ji-Youn Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 337 days.

(21) Appl. No.: 14/290,166

(22) Filed: May 29, 2014

(65) Prior Publication Data

US 2015/0121242 A1    Apr. 30, 2015

(30) Foreign Application Priority Data

Oct. 28, 2013   (KR) .................. 10-2013-0128706

(51) Int. Cl.
*G06F 3/048* (2013.01)
*G06F 3/0482* (2013.01)
*G06F 17/30* (2006.01)

(52) U.S. Cl.
CPC ...... *G06F 3/0482* (2013.01); *G06F 17/30029* (2013.01); *G06F 17/30038* (2013.01)

(58) Field of Classification Search
CPC .................. G06F 17/30029; G06F 17/30038
USPC ....................................................... 715/739
See application file for complete search history.

(56) References Cited

U.S. PATENT DOCUMENTS

| | | | | |
|---|---|---|---|---|
| 7,548,936 | B2* | 6/2009 | Liu | G06F 17/30274 |
| 7,921,221 | B2* | 4/2011 | Minborg | G06F 17/3002 709/217 |
| 7,962,948 | B1* | 6/2011 | Girouard | G06Q 30/02 725/105 |
| 8,538,235 | B2* | 9/2013 | Nabeshima | G11B 27/105 386/239 |
| 8,850,359 | B2* | 9/2014 | Kubo | G06F 17/30253 715/838 |
| 8,965,908 | B1* | 2/2015 | Mayorov | 707/754 |
| 9,060,034 | B2* | 6/2015 | Black | G06Q 10/107 |
| 9,224,427 | B2* | 12/2015 | Black | G11B 27/28 |
| 9,269,090 | B2* | 2/2016 | Lehtiniemi | G06Q 30/02 |
| 9,406,072 | B2* | 8/2016 | Whitman | G06F 17/30029 |
| 9,454,289 | B2* | 9/2016 | Wheeler | G06F 3/0482 |
| 2008/0147711 | A1 | 6/2008 | Spiegelman et al. | |
| 2010/0185987 | A1 | 7/2010 | Yang et al. | |
| 2011/0265120 | A1 | 10/2011 | Vaysman et al. | |

(Continued)

OTHER PUBLICATIONS

J. Ben Schafer, Joseph Konstan, & John Riedl, Recommender Systems in E-Commerce, Proceedings ACM Conference on Electronic Commerce, Jan. 1, 1999, pp. 158-166, XP002199598.

*Primary Examiner* — David Phantana Angkool
(74) *Attorney, Agent, or Firm* — Cha & Reiter, LLC (57) ABSTRACT

The present disclosure relates to an electronic device and a method of controlling a screen. The method of controlling a screen of an electronic device includes transmitting a request comprising at least one keyword to a server. Thumbnails are arranged into an image. The thumbnails are associated with digital content corresponding most with at least one keyword in the request. The image is rendered on a screen.

27 Claims, 6 Drawing Sheets

(56) References Cited

U.S. PATENT DOCUMENTS

2012/0042251 A1\* 2/2012 Rodriguez ........... G11B 27/034
715/723
2013/0097560 A1 4/2013 Park et al.
2013/0204862 A1\* 8/2013 Marchiori ......... G06F 17/30554
707/722

\* cited by examiner

ELECTRONIC DEVICE AND METHOD FOR CONTROLLING A SCREEN

CROSS-REFERENCE TO RELATED APPLICATION

This application claims the priority under 35 U.S.C. §119(a) to Korean Application Serial No. 10-2013-0128706, which was filed in the Korean Intellectual Property Office on Oct. 28, 2013, the entire content of which is hereby incorporated by reference.

TECHNICAL FIELD

The present disclosure relates to an electronic device and a method of controlling a screen.

BACKGROUND

Recently, various services and additional functions provided by an electronic device have been gradually expanded. In order to improve an effective value of the electronic device and satisfy user demands, various applications executable in the electronic device have been developed. Furthermore, desired content may now be downloaded by inputting a keyword into the electronic device. Today, at least several to several hundreds of applications capable of reproducing or displaying various digital content may be stored in the electronic device. Electronic devices heretofore may be portable and may include a screen having a touch function, such as a smart phone, a mobile phone, a notebook Personal Computer (PC), and a tablet PC. Through the electronic device, a user may search for or download desired content and the electronic device may display thumbnails of various digital content corresponding to a keyword input from the user or receive corresponding content from a server and display the received digital content.

Figure 1:
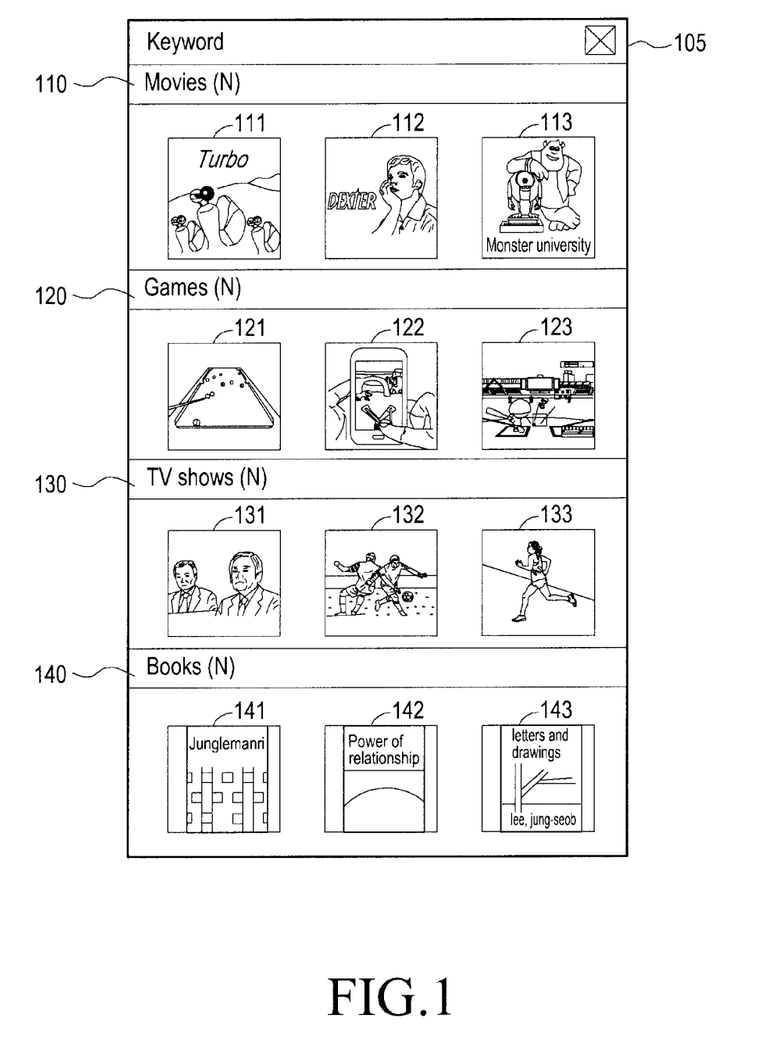
FIG. 1 is a diagram illustrating an example in which a plurality of thumbnails of an electronic device in the related art is displayed.

FIG. 1 is a diagram illustrating an example in which a plurality of thumbnails of an electronic device in the related art are displayed.

As illustrated in FIG. 1, the electronic device classifies and displays various thumbnails corresponding to a keyword input on a screen 105 based on a category, and displays a plurality of thumbnails included in each category on the screen 105 in an arbitrary order. The categories are classified into movies 110, games category 120, TV shows 130, and books category 140 in accordance with the input keyword. Further, the thumbnails of the movie category are displayed in an order of Turbo 111, DEXTER 112, and Monster University 113, and the thumbnails in the game category 120 are displayed in an order of billiards 121, a mobile game 122, and baseball 123. Further, the thumbnails of the TV shows 130 are displayed in an order of debate 131, soccer 132, and race 133, and the thumbnails of the book category 140 are displayed in an order of JUNGLE MANRI 141, Power of Relationship 142, and Letters and Drawings 143. The user may display or reproduce desired content through the displayed thumbnails.

In the example of FIG. 1, the display order of the thumbnails is determined by a provider of the digital content. However, a user may want to adjust the thumbnails in accordance with his/her preference and field of interest. Accordingly, in order to provide such feature, it is necessary to configure and display digital content in accordance with a preference or field of interest of the user in view of the keywords in the search request.

As described above, thumbnails corresponding to a keyword are defined by an operator or classified as meta tags in accordance with a predetermined or default concept structure (e.g., first category, second category, third category etc.). Thus, it is currently difficult to dynamically change or adjust a configuration of the thumbnails based on a user's preference or intent. Furthermore, an operator may provide thumbnails corresponding to an input keyword in a uniform manner, so that it may be difficult to compare or select different types of thumbnails. This may limit the delivery of a new product or may limit a user's plan.

SUMMARY

In view of the foregoing, an aspect of the present disclosure is to provide an electronic apparatus and a method of controlling thumbnails associated with digital content on a screen. Another aspect of the present disclosure is to provide a server and a method of providing digital content.

In accordance with an aspect of the present disclosure, a method of controlling a screen of an electronic device includes: transmitting a request for digital content to a server; rendering an image in a first region of the screen containing thumbnails received from the server such that each thumbnail in the image is associated with digital content that corresponds most with at least one keyword in the request; and displaying thumbnails received from the server in another region of the screen different from the first region such that each thumbnail in the other region is associated with digital content that does not correspond most with at least one keyword in the request.

In one example, the correspondence may be further based on at least one of a current position of the electronic device, a user schedule stored in the electronic device, digital content purchasing information, the number of times given digital content was reproduced, the number of times a given keyword was used in past requests, a title of digital content, meta data of digital content, a tag of digital content, and review information regarding digital content.

The thumbnails contained in the image may further correspond to a priority such that the priority may be based on at least one of the number of times a keyword was used in past requests, the number of times given digital content was downloaded, a user preference, a popularity order, and a predetermined condition.

The method according to the embodiment of the present disclosure may further include transmitting the rendered image to the server in response to a request by another electronic device.

In one example, the first region may be displayed on a partial region or an entire region of the screen.

In another example, each of the thumbnails in the image may be subjected to at least one of size adjustment, position movement, and deletion, and at least one of size adjustment and position movement of at least one other thumbnail may be performed in response to at least one of the size adjustment, the position movement, and the deletion of each of the thumbnails.

In yet a further example, the method may further include: determining whether a request to delete a thumbnail included in the image is received, and inserting an arbitrary image into a position of the deleted thumbnail or inserting a succeeding thumbnail having priority in the position of the deleted thumbnail.

In another aspect of the present disclosure, an electronic device for controlling a screen may include: a communication unit to transmit a request for digital content to a server and to receive thumbnails associated with the digital content; and a controller that renders one image in a first region of the screen such that the image contains thumbnails associated with digital content corresponding most with at least one keyword in the request or with digital content having a highest priority.

In a further example, the communication unit may transmit data to the server such that the data includes at least one of a current position of the electronic device, a user schedule stored in the electronic device, digital content purchasing information, a number of times given digital content was reproduced, and a number of times a given keyword was transmitted to the server, each thumbnail received from the server to be associated with digital content at least partially corresponding to the transmitted data.

In yet a further example, the controller may perform at least one of a size adjustment and position movement of each received thumbnail by using a priority of at least one of the number of times a given keyword was used in past requests, the number of times given digital content was downloaded, a user preference, a popularity order, and a predetermined user condition.

In another aspect, the controller may divide the screen into a plurality of regions in response to receiving the thumbnails and display and classify thumbnails associated with digital content not corresponding most with at least one keyword in the request or with digital content not having a highest priority in a region of the screen different from the first region.

In a further aspect, the controller may insert an arbitrary image into a position of a thumbnail deleted from the image or to move a succeeding thumbnail having priority in the position of the thumbnail deleted from the image.

In accordance with another aspect of the present disclosure, a method of providing a content by a server includes: receiving a request for digital content from an electronic device; obtaining thumbnails associated with digital content corresponding most with at least one keyword in the request; arranging the thumbnails into one image; and transmitting the image to the electronic device.

The method according to another example may further include analyzing data received from the electronic device in which the data includes at least one of a current position of the electronic device, a user schedule stored in the electronic device, digital content purchasing information, the number of times given digital content was reproduced, and the number of times a given keyword was received from the electronic device.

The method according to aspects of the present disclosure may further include transmitting the image to another electronic device in response to receipt of the request from the other electronic device.

In accordance with another aspect of the present disclosure, a server for providing digital content may include: a transceiver to receive a request for digital content from an electronic device and a controller to arrange thumbnails into one image and to transmit the image to the electronic device through the transceiver such that each thumbnail is associated with digital content having a highest correspondence with at least one keyword in the request.

The controller according to another aspect of the present disclosure may generate the image by using at least one of size adjustment and position movement of each of the thumbnails.

The controller according to another aspect of the present disclosure may determine the correspondence based on at least one of a current position of the electronic device, a user schedule stored in the electronic device, digital content purchasing information, a number of times given digital content was reproduced, and a number of times a given keyword was received from the electronic device.

The controller according to another aspect of the present disclosure may further arrange the thumbnails in the image based on a priority of digital content associated with each thumbnail such that the priority is based on at least one of a number of times a given keyword was received, a number of times given digital content was downloaded, a user preference, a popularity order, and a predetermined condition.

The present disclosure may include various examples without departing from the scope of the present disclosure in addition to the aforementioned examples.

According to the various examples discussed herein, an electronic device and method for controlling a screen is disclosed that provides a user with more convenient thumbnail arrangement features. Furthermore, a server and method of providing a digital content is disclosed that contributes to improving profitability.

Moreover, according to examples discussed herein, a request comprising at least one keyword may be transmitted to a server, thumbnails associated with the digital content received from the server in response to the request may be arranged in one image, and the generated image may be displayed on a screen, thereby providing a new content-combination-type display.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

The present disclosure may have various modifications and embodiments and thus will be described with reference to specific embodiments in detail. Therefore, it should be understood that there is no intent to limit example embodiments to the particular forms disclosed, but on the contrary, example embodiments are to cover all modifications, equivalents, and alternatives falling within the scope of the disclosure.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

The terms used herein are merely used to describe specific embodiments, and are not intended to limit the present disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an operation principle for an embodiment of the present disclosure will be described in detail with reference to the accompanying drawings. In the following description of examples, a detailed description of known configurations or functions incorporated herein will be omitted when it is determined that the detailed description may make the subject matter of the present disclosure unclear. The terms which will be described below are terms defined in consideration of the functions in the present disclosure, and may be different according to users, intentions of the users, or customs. Therefore, the definitions should be made based on the entire contents of the present specification.

Figure 2:
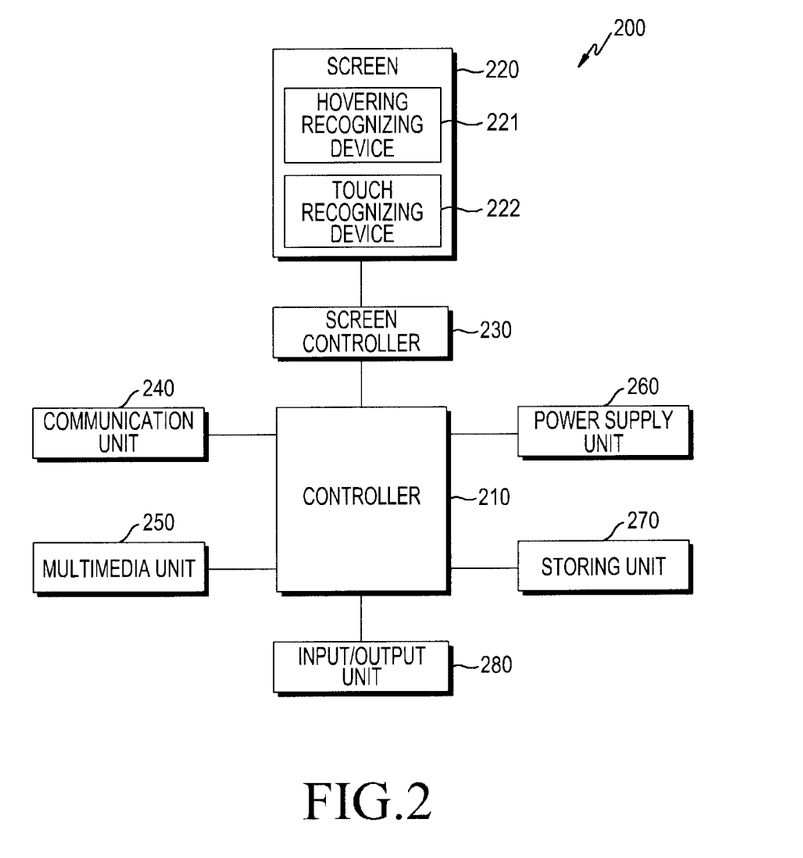
FIG. 2 is a diagram illustrating an example of an electronic device according with aspects of the present disclosure.

FIG. 2 is a diagram illustrating an example of an electronic device according to aspects of the present disclosure.

Referring to FIG. 2, an electronic device 200 may be connected with an external device (not shown) by using at least one of a communication unit 240, a connector (not shown), and an earphone connecting jack (not shown). The external device may include various devices attached to or detached from the electronic device 200 through a wire, such as an earphone, an external speaker, a Universal Serial Bus (USB) memory, a charger, a cradle/dock, a DMB (Digital Multimedia Broadcasting) antenna, a mobile payment related device, a health management device (blood sugar tester or the like), a game machine, a car navigation device and the like. Further, the electronic device may include a Bluetooth communication device, a Near Field Communication (NFC) device, a Wi-Fi Direct communication device, and a wireless Access Point (AC) which may be wirelessly connected. Further, the electronic device may be wiredly or wirelessly connected to another device, for example, a portable terminal, a smart phone, a tablet PC, a desktop PC, a digitizer, an input device, a camera, and a server.

Referring to FIG. 2, the electronic device 200 may include at least one screen 220 and at least one screen controller 230. Further, the electronic device 200 may include a screen 220, a screen controller 230, a communication unit 240, a multimedia unit 250, a power supplying unit 260, a storage unit 270, and an input/output unit 280.

In the present disclosure, the electronic device may be a mobile terminal capable of performing data transmission/reception and a voice/video call. The electronic device may include one or more screens, and each of the screens may display one or more pages. The electronic device may include a smart phone, a tablet PC, a 3D-TeleVision (TV), a smart TV, a Light Emitting Diode (LED) TV, and a Liquid Crystal Display (LCD) TV, and may also include all devices which are capable of communicating with a peripheral device or another terminal located at a remote place. Further, the one or more screens included in the electronic device may receive an input by at least one of a touch and a hovering.

The electronic device 200 may include at least one screen 220 providing a user with user interfaces corresponding to various services (for example, a call, data transmission, broadcasting, photographing, and input of a character string). Each of the screens includes a hovering recognizing device 221 for recognizing an input by using a hovering of at least one of an input unit and a finger and a touch recognizing device 222 for recognizing an input by using a touch of at least one of a finger and an input unit, and the hovering recognizing device 221 and the touch recognizing device 222 may also be referred to as a hovering recognizing panel and a touch panel, respectively. Each of the screens may transmit at least one touch input to the user interface or an analog signal corresponding to at least one hovering to a corresponding screen controller. As described above, the electronic device 200 may include a plurality of screens, and each of the screens may include a screen controller receiving an analog signal corresponding to a touch or a hovering. The screens may be connected with a plurality of housings through hinge connections, respectively, or the plurality of screens may be located at one housing without the hinge connection. In the various embodiments of the present disclosure, the electronic device 200 may include at least one screen as described above, and hereinafter, a case in which the electronic device 200 includes one screen will be described for convenience of a description. Further, the input unit according to the various embodiments of the present disclosure may include at least one of a finger, an electronic pen, a digital pen, a pen including no integrated circuit, a pen including an integrated circuit, a pen including an integrated circuit and a memory, a pen capable of performing near field communication, a pen including an additional ultrasonic detection unit, a pen including an optical sensor, a joystick, and a stylus pen, which may provide a command or an input to the electronic device even in a contact state of the digitizer or a non-contact state, such as a hovering.

The controller 210 may include a Central Processing Unit (CPU), a Read Only Memory (ROM) storing a control program for controlling the electronic device 200, and a Random Access Memory (RAM) used as a storage area for storing a signal or data input from the outside of the electronic device 200 or for work performed in the electronic device 200. The CPU may include a single core, a dual core, a triple core, or a quadruple core.

Further, the controller 210 may control at least one of the screen 220, the hovering recognizing device 221, the touch recognizing device 222, the screen controller 230, the communication unit 240, the multimedia unit 250, the power supplying unit 260, the storage unit 270, and the input/output unit 280.

The controller 210 may determine whether a hovering according to an approach of at least one object by various input units in a state where various digital content or thumbnails are displayed on the screen 220, and identify digital content or a thumbnail corresponding to a position at which the hovering is generated. Further, the controller 210 may detect a height from the electronic device 200 to the input unit, and a hovering input event according to the height, in which the hovering input event may include at least one of a press of a button formed in the input unit, a tap on the input unit, a movement of the input unit at a speed higher than a predetermined speed, and a touch on an object.

Further, the controller 210 according to an aspect of the present disclosure transmits a request comprising at least one keyword through screen 220 to the server, renders thumbnails associated with digital content received in response to the request into one image, and displays the generated image on the screen. The controller 210 may transmit the generated image to the server, and the image transmitted to the server may be provided in response to a request by another electronic device. Further, each of the received thumbnails may be associated with digital content corresponding to at least one keyword in the request. The correspondence may be determined based on at least one of a current position of the electronic device, a user schedule stored in the electronic device, digital content purchasing information, the number of times given digital content was reproduced, the number of times a keyword was used in past requests, a title of the digital content, meta data of the digital content, a tag of the digital content, and review information regarding the digital content. The controller 210 may compose the image based on a priority of each thumbnail. The priority may be further based on at least one of a number of times a given keyword was used in past requests, a number of times given digital content was downloaded, a preference of a user, a popularity order, and a predetermined condition. Further, the priority may be adjusted by a supplier of digital content or a manager of the server receiving the requests. The priority may be adjusted under various conditions, such as a search ranking of a keyword and the number of times given content was provided, or the number of times a given request was received from the plurality of electronic devices.

Further, when one or more thumbnails are received, the controller 210 may compose one image with the received one or more thumbnails. The controller 210 may divide the screen 220 into at least two regions in order to display the composed image on the screen 220. Each region may be adjusted by at least one of a size and a position, and the controller 210 may display the composed image on any one region. Controller 210 may further classify the content corresponding to the input keyword by category and may display at least one thumbnail associated with digital content on the remaining regions for each category. Further, the number of thumbnails of the image may be adjusted under a predetermined condition. The predetermined condition may be determined by the user. Alternatively, the predetermined condition may be based on the size or performance of the screen 220 of the electronic device. One or more thumbnails may be received in response to the predetermined condition. Further, each thumbnail included in the image may be adjusted by at least one of size adjustment, position movement, and deletion. Further, each thumbnail may include a function executable in response to at least one command among deletion, downloading, and sharing, and when the command is received, the controller 210 may respectively delete a corresponding thumbnail displayed on the screen 220, transmit a request for digital content associated with the thumbnail to the server, or transmit information about the thumbnail to another electronic device.

The controller 210 may reproduce the corresponding contents received in response to selection of a given thumbnail included in the image on the screen 220. The controller 210 may reproduce the received content on a region of the corresponding thumbnail, on the whole screen of electronic device 200, or in the generated image. Further, when a given thumbnail included in the image is deleted, the controller 210 may insert an arbitrary image into a position of the deleted thumbnail or move a succeeding thumbnail with priority into the position. A position or an order of each of the thumbnails composing the image may be determined based on the priority.

Furthermore, the controller 210 according to another aspect of the present disclosure transmits a request with at least one keyword to the server, and when each thumbnail associated with digital content is received in response to the request, the controller 210 composes one image by using at least one of the size adjustment and the position adjustment of each of the received thumbnails and displays the generated image on the screen 220. The controller 210 may adjust at least one of a size and a position of each received thumbnail by using a priority of at least one of a number of times a given keyword was used in past requests, a number of times given digital content was downloaded, a preference of a user, a popularity order, and a predetermined condition. The controller 210 may add at least one function to each thumbnail so that a corresponding function is performed in response to selection of at least one function of deletion, transmission, sharing, and downloading of a thumbnail. The controller 210 may divide the screen 220 into at least two regions in response to receiving the thumbnails. The controller 210 may adjust a size of each region or a display position, and may display the composed image on any one region. For example, the controller 210 may display the generated image on a first region, may classify contents corresponding to the input keyword based on a category, and display the contents in the remaining regions different than the first region. Furthermore, the controller 210 may display the generated image on the whole screen 220. That is, the first region may comprise the whole screen 220 or part of screen 220.

Further, the controller 210 may control at least one of the size adjustment and the position movement of at least one other thumbnails in response to the size adjustment, position movement, and deletion of a given thumbnail in the generated image. For example, in a case where a command for enlarging a size of a given thumbnail is input, the controller 210 may enlarge the corresponding thumbnail in response to the input of the command, and may decrease a size of at least one other thumbnail because the size of the screen 220 is fixed. The command may be input by a gesture using at least one of the touch and the hovering. Further, in a case where a command for moving the position of an arbitrary thumbnail is input, the controller 210 may move a position of the corresponding thumbnail in response to the command, and may also move a position of at least one other thumbnail. The size and the position of each thumbnail among the other thumbnails may be adjusted at a different ratio or may be adjusted at the same ratio according to priority. Furthermore, the controller 210 may insert an arbitrary image into a position of the deleted thumbnail or move a position of a succeeding thumbnail having priority in response to the deletion of a given thumbnail in the generated image. One or more thumbnails may be deleted by the user in a state where one or more thumbnails are displayed on the screen 220, and the controller 210 may insert an image into a position or a region of the corresponding deleted thumbnail in response to the deletion of the one or more thumbnails. Further, when one or more thumbnails are deleted, the controller 210 may move a position of a thumbnail having a lower or higher priority than that of the deleted thumbnail.

Further, the screen 220 may receive at least one touch through a user's body (for example, fingers including a thumb) or an input unit capable of performing a touch (for example, a stylus pen or an electronic pen). Further, when an input is performed through a pen, such as a stylus pen or an electronic pen, the screen 220 may include the hovering recognizing device 221 recognizing the hovering or the touch recognizing device 222 recognizing a touch according to an input method. The hovering recognizing device 221 may recognize a distance between the pen and the screen 220 through magnetic field information, ultrasonic information, optical information, or surface acoustic waves, and the touch recognizing device 222 may detect a touched position by using charges moving by the touch. Further, the touch recognizing device 222 may detect all of the touches capable of generating static electricity, and may also detect a touch by a finger or a pen, which is the input unit. Further, the screen 220 may receive at least one gesture by at least one of at least one touch and hovering. The gesture includes at least one of a touch, a tap, a double tap, a flick, a drag, a drag & drop, a swipe, a multi swipe, a pinch, touch & hold, shaking, and rotating according to the input method. The touch is a gesture of putting the input unit on the screen 220, the tap is a gesture of shortly and lightly tapping the screen 220 with the input unit, the double tap is a gesture rapidly tapping the screen 220 twice, the flick is a gesture of putting the input unit on the screen 220 rapidly moving the input unit, and then detaching the input unit from the screen 220 (for example, a scroll), the drag is a gesture of moving or scrolling an object displayed on the screen 220, the drag & drop is a gesture of moving an object in a state where the input unit touches the screen 220, and then detaching the input unit in a state where the input unit is stopped, the swipe is a gesture of moving the input unit by a predetermined distance in a state where the input unit touches the screen 220, the multi swipe is a gesture of moving at least two input units (or fingers) by a predetermined distance in a state where the input units touch the screen 220, the pinch is a gesture of moving at least two input units (or fingers) in different direction in a state where the input units touch the screen 220, the touch & hold is gesture of inputting a touch or a hovering into the screen 220 until an object, such as a Help balloon, is displayed, the shake is a gesture of shaking the electronic device and performing an operation, and the rotating is a gesture of changing a direction of the screen 220 from a vertical direction to a horizontal direction or from a horizontal direction to a vertical direction. Further, the gesture in the present disclosure may include a swipe using a hovering on the screen 220 and a flick using a hovering on the screen 220, as well as the swipe of moving the input unit by the predetermined distance in the state where the input unit touches the screen 220 and the flick of rapidly moving the input unit in the state where the input unit touches the screen 220 and then detaching the touch from the screen. Further, the present disclosure may be performed by using at least one of the aforementioned gestures, and may include a gesture by at least one of various touches and hovering recognizable by the electronic device in addition to the aforementioned gestures.

Further, the screen 220 may transmit an analog signal corresponding to at least one gesture to the screen controller 230.

Further, the touch in various exemplary embodiments of the present disclosure is not limited to a contact between the screen 220 and a body of a user or an input unit which may perform a touch, and may include a noncontact (for example, a detectable interval without a contact between the screen 220 and a body of a user or an input unit which may perform a touch). The interval which can be detected by the screen 220 may be changed according to a capability or a structure of the electronic device 100. The interval detectable on the screen 220 may be changed according to performance or a structure of the electronic device 200, and for example, the screen 220 may be configured to differently output values (including a voltage value or a current value as an analog value) detected by the touch event and the hovering event so as to distinguish the touch event by a contact with the body of the user or the input unit capable of making a touch from an input event (for example, a hovering) in a non-contact state and detect the touch event and the input event. Further, the screen 220 may differently output detected values (for example, a current value or the like) according to a distance between a space where the hovering event is generated and the screen 220.

The hovering recognizing device 221 or the touch recognizing device 222 may be implemented by, for example, a resistive method, a capacitive method, an infrared method, or an acoustic wave method.

Further, the screen 220 may include two or more touch screen panels which may detect touches or approaches of the user's body and the input unit capable of making a touch in order to sequentially or simultaneously receive inputs by the user's body and the input unit capable of making a touch. The two or more touch screen panels provide different output values to the screen controller, and the screen controller may differently recognize the values input into the two or more touch screen panels to distinguish whether the input from the screen 220 is an input by the user's body or an input by the input unit capable of making a touch. Further, the screen 220 may display at least one object or an input character string.

More particularly, the screen 220 may be formed in a structure in which a touch panel detecting an input with a finger or the input unit through a change in induced electromotive force and a panel detecting a contact with the screen 220 through the finger or the input unit are in close contact with or are partially separated from each other and sequentially stacked. The screen 220 may include a plurality of pixels, and display an image or notes input by the input unit or the finger through the pixels. The screen 220 may use a Liquid Crystal Display (LCD), an Organic Light Emitting Diode (OLED), or a Light Emitting Diode (LED).

Further, the screen 220 may include a plurality of sensors recognizing a location position of the finger or the input unit when the finger or the input unit is in contact with a surface of the screen 220 or is located at a predetermined distance from the screen 220. Each of the plurality of sensors may be formed in a coil structure, and in a sensor layer formed of the plurality of sensors, each of the sensors may have predetermined patterns, and a plurality of electrode lines may be formed. According to the structure, when a contact is generated on the screen 220 through the finger or the input unit, the touch recognizing device 222 generates a detection signal of which a waveform is changed due to capacitance between the sensor layer and the input means, and the screen 220 may transmit the generated detection signal to the controller 210. Further, a predetermined distance between the input unit and the hovering recognizing device 221 may be recognized through intensity of a magnetic field formed by the coil.

The screen controller 230 converts an analog signal received by a character string input on the touch screen display 220 to a digital signal (for example, X and Y coordinates) and transmits the converted digital signal to the controller 210. The controller 210 may control the screen 220 by using the digital signal received from the screen controller 230. For example, the controller 210 may allow a short-cut icon (not shown) or an object displayed on the screen 220 to be selected or executed in response to a touch event or a hovering event. Further, the screen controller 230 may be included in the controller 210.

Further, the screen controller 230 may identify a distance between a space in which the hovering event is generated and the screen 220 by detecting a value (For example, a current value) output through the screen 220, and may convert the identified distance value to a digital signal (for example, a z-coordinate) and provide the controller 210 with the converted digital signal.

The communication unit 240 may include a mobile communication unit (not shown), a sub communication unit (not shown), a wireless LAN unit (not shown), and a near field communication unit (not shown) according to a communication method, a transmission distance, and the type of transceived data. One or more contents according to the various embodiments of the present disclosure may be received through the communication unit 240. The mobile communication unit permits the electronic device 200 to be connected with an external device through mobile communication by using one or more antennas (not shown) under the control of the controller 210. The mobile communication unit may transceive a wireless signal for a voice call, a video call, a Short Message Service (SMS), or a Multimedia Messaging Service (MMS) with a portable phone (not shown), a smart phone (not shown), a tablet PC, or another device (not shown) having a telephone number input to the electronic device 200. The sub communication unit may include at least one of the wireless LAN unit (not shown) and the near field communication unit (not shown). For example, the sub communication unit may include only the wireless LAN module, or only the near field communication unit, or both the wireless LAN unit and the near field communication unit. Further, the sub communication unit may transceive a control signal with the input unit. The control signal transceived between the electronic device 200 and the input unit may include at least one of a field for supplying power to the input unit, a field detecting a touch or a hovering between the input unit and the screen 220, a field detecting a press or an input of a button included in the input unit, an identifier of the input unit, and a field indicating an X-axis coordinate and a Y-axis coordinate at which the input unit is located. Further, the input unit may transmit a feedback signal for the control signal received from the electronic device 200 to the electronic device 200. Further, the wireless LAN unit may access the Internet in a place where a wireless Access Point (AP) (not shown) is installed under the control of the controller 210. The wireless LAN unit supports the wireless LAN standard (IEEE802.11x) of the Institute of Electrical and Electronics Engineers (IEEE). The near field communication unit may wirelessly perform near field communication between the electronic device 200 and an image forming device (not shown) under the control of the controller 210. A near field communication scheme may include Bluetooth, Infrared Data Correlation (IrDA) communication, Wi-Fi-Direct communication, Near Field Communication (NFC) and the like.

The controller 210 may communicate with an adjacent communication device or a remotely located communication device through at least one of the sub communication unit and the wireless LAN unit, and may receive and control various data, such as an image, an emoticon, and a picture, and communicate with the input unit through an Internet network. The communication may be performed by using transmission/reception of the control signal.

Further, the electronic device 200 may include at least one of the mobile communication unit, the wireless LAN unit, and the near field communication unit according to performance. Further, the electronic device 200 may include a combination of the mobile communication unit, the wireless LAN unit, and the near field communication unit according to performance. In the various embodiments of the present disclosure, at least one or the combination of the mobile communication unit, the wireless LAN unit, the screen, and the near field communication unit is referred to as a transceiving unit, which does not limit the scope of the present disclosure.

The multimedia unit 250 may include a broadcasting communication unit (not shown), an audio reproduction unit (not shown), or a video reproduction unit (not shown). The broadcasting communication unit may receive a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna (not shown) under the control of the controller 210. The audio reproduction unit may reproduce a digital audio file (for example, a file having a file extension of mp3, wma, ogg, or wav) stored or received under the control of the controller 210. The video reproduction unit may reproduce a digital video file (for example, a file having a file extension of mpeg, mpg, mp4, avi, mov, or mkv) or contents stored or received under the control of the controller 210. The video reproduction unit may reproduce a digital audio file. Further, the multimedia unit 250 may include at least one of a module, a program, and an application for reproducing at least one content.

The power supplying unit 260 may supply power to one battery or a plurality of batteries (not shown) arranged at the housing of the electronic device 200 under the control of the controller 210. One or plural batteries (not shown) may supply power to the electronic device 200. Further, the power supplying unit 260 may supply power input from an external power source (not shown) through a wired cable connected to a connector (not shown) to the electronic device 200. In addition, the power supplying unit 260 may supply power wirelessly input from the external power source through a wireless charging technology to the electronic device 200.

The storage unit 270 may store a signal or data input/output in response to operations of the communication unit 240, the multimedia unit 250, the screen 220, and the input/output unit 280 under the control of the controller 210. Further, the storage unit 270 may store a control program and applications for controlling the electronic device 200 or the controller 210, and may store a program or an application capable of reproducing various digital content. Further, the storage unit 270 may store keywords input to screen 220, the number of times a given keyword was used in past requests, the number of times given digital content was downloaded, user preferences, digital content popularity order, and a predetermined condition. The storage unit 270 may include a nonvolatile memory, a volatile memory, a Hard Disk Drive (HDD), or a Solid State Drive (SSD).

Further, the storage unit 270 may store at least one of a character, a word, and a character string input to the screen 220, and the user may store various data, such as a text, an image, an emoticon, an icon, and contents, received through the Internet network. In addition, the storage unit 270 may store applications having various functions, such as a navigation, video calls, games, time-based alert applications, or the like, images for providing a Graphical User Interface (GUI) related to the applications, a database or data related to user information, documents and a method of processing a touch input, background images (e.g., a menu screen, an idle screen, etc.) necessary for driving the electronic device 200, operating programs, and images captured by a camera unit (not shown). The storing unit 270 may be a non-transitory machine (for example, computer)-readable medium, and the term of the non-transitory machine-readable medium may be defined as a medium for providing data to the machine so as to perform a specific function. The non-transitory machine-readable medium may be a storage medium. The storage unit 270 may include a non-volatile medium and a volatile medium. All of these media should be a tangible type in which commands transferred by the media may be detected by a physical instrument reading the commands with the machine.

Further, the input/output unit 280 may include at least one of the plurality of buttons, the microphone, the speaker, the vibration motor, the connector, a keypad, and an earphone connection jack. Further, the input/output unit 280 may include at least one screen 220. Further, the input/output unit is not limited thereto, and a cursor control, such as a mouse, a trackball, a joystick, or cursor direction keys, may be provided in order to control a movement of a cursor on the screen 220 through the communication with the controller 210. The speaker (not shown) in the input/output unit 280 may output a sound corresponding to control of at least one content displayed on the screen 220, and the vibration motor (not shown) may also output vibration corresponding to control of at least one content displayed on the screen 220.

Figure 3:
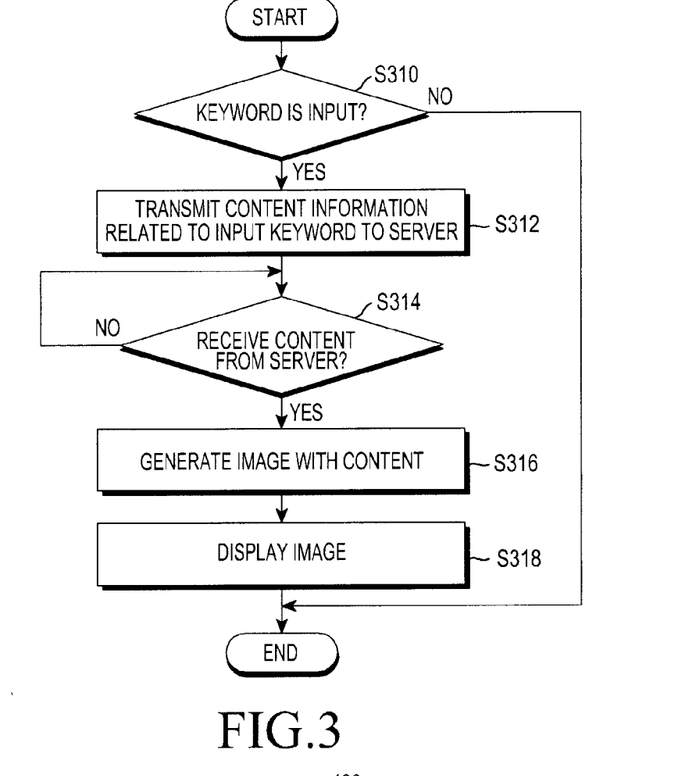
FIG. 3 is a flowchart illustrating an example method of controlling a screen of the electronic device in accordance with aspects of the present disclosure.

FIG. 3 is a flowchart illustrating an example method of controlling the screen of the electronic device in accordance with aspects of the present disclosure.

Hereinafter, a method of controlling the screen of the electronic device according to aspects of the disclosure will be described in detail with reference to FIG. 3.

When a request comprising at least one keyword is input, the controller 210 transmits content information related to the keywords to the server (S310 and S312). The controller 210 may transmit a request for one or more digital contents or a thumbnail of the one or more contents having correlation with the one or more input keywords to the server. When one or more keywords are input, the controller 210 may transmit the one or more input keywords to the server. The electronic device 200 may receive digital content or thumbnails associated with digital content from the server, and the digital contents or the number of thumbnails associated with digital content may correspond to a predetermined condition. The correspondence may be determined based on at least one of a current position of the electronic device, a user schedule stored in the electronic device, digital content purchasing information, a number of times given digital content was reproduced, a number of times a given keyword was sent to the electronic device, digital content title, meta data of the digital content, a tag of the digital content, and review information regarding the digital content.

When the digital content is received from the server, the content may generate an image (S314 and S316). When the keyword is transmitted to the server, the electronic device 200 may receive digital content or a thumbnail associated with content that corresponds to at least one keyword in the request. Further, the controller 210 may generate one image including the one or more received thumbnails. Each received thumbnail may be associated with digital content at least partially corresponding to a transmitted keyword. The controller 210 may generate the image based on a priority associated with each thumbnail. The priority may be determined based on at least one of the number of times a given keyword was used in past requests, the number of times given digital content was downloaded, a user preference, a popularity order, and a predetermined condition. Each of the thumbnails in the image may be subjected to at least one of size adjustment, position movement, and deletion. Further, at least one of size adjustment and position movement of at least one other thumbnail may be controlled in response to at least one of a size adjustment, position movement, and deletion of each thumbnail. For example, when an arbitrary thumbnail included in the image is deleted, the controller 210 may insert an arbitrary image into a position of the deleted thumbnail or move a succeeding thumbnail with priority into the position of the deleted thumbnail.

Further, the generated image is displayed (S318). The controller 210 may divide the screen 220 into at least two regions. Each region may be adjusted by at least one of a size and position, and controller 210 may display the generated image on any one region and classify the digital content by category. Furthermore, controller 210 may display each respective thumbnail of the digital content on the remaining regions for each classified category. When a command for selecting a corresponding thumbnail among the one or more thumbnails in the image is input in order to receive the associated digital content, the controller 210 may transmit a request for the content corresponding to the selected thumbnail to the server and display the content received from the server on the screen 220.

Figure 4:
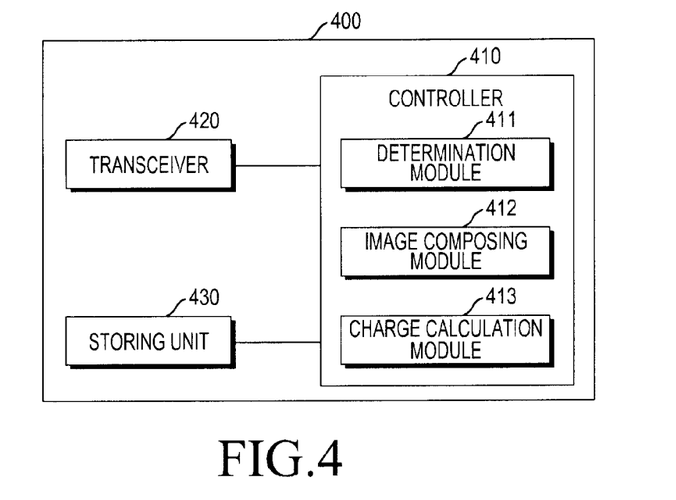
FIG. 4 is a block diagram illustrating an example server providing digital content in accordance with aspects of the present disclosure.

FIG. 4 is a block diagram illustrating a server providing digital content according to another aspect of the present disclosure.

As illustrated in FIG. 4, a server 400 providing content according to another aspect of the present disclosure includes a controller 410, a transceiver 420, and a storage unit 430.

The controller 410 obtains thumbnails associated with digital content corresponding to at least one keyword in the request received from the transceiver 420 and arranges some of the thumbnails into one image. Controller 410 transmits the generated image to the electronic device 200 through the transceiver 420. The controller 410 may include a determination module 411 for determining correspondence between the received keywords and the digital content, an image composing module 412 for generating the thumbnail associated with the digital content, and a charge calculation module 413 for calculating and imposing a charge by the provided image in a case where the composed image is provided to another electronic device. The determination module 411, the image composing module 412, and the charge calculation module 413 may be included within the controller 410, or may be separately included within the server. The determination module 411 may determine correspondence between keywords received from the electronic device 200 by using data including at least one of a current position of the electronic device 200, a user schedule stored in the electronic device 200, digital content purchase information, the number of times the given digital content was reproduced, and the number of times a given keyword was used in past requests, The thumbnail may be associated with digital content corresponding to a received keyword. Further, the image composing module 412 may generate the thumbnail of digital content corresponding with the received keyword into one image by using at least one of size adjustment and position adjustment of each thumbnail. Further, the image composing module 412 may compose the image by using a priority of each thumbnail.

Further, the controller 410 may analyze at least one keyword received from the electronic device 200, and determine a content server corresponding to the analyzed keyword. Further, the controller 410 may transmit the received keyword to a corresponding content server, and receive digital contents or a thumbnail associated with digital content in response to the transmitted keyword from the content server. Further, the controller 410 may compose the thumbnail of the digital content into one image, and store the generated image in the storing unit 430 or transmit the generated image to the electronic device transmitting the keyword or one or more other electronic devices.

The transceiver 420 may receive the keyword or content information corresponding to the keyword from the electronic device 200 and may receive digital content from the content server (not shown) providing the content. Further, the transceiver 420 may transmit the generated image to another electronic device in response to a request by another electronic device. The transceiver 420 may include a mobile communication unit (not shown), a sub communication unit (not shown), a wireless LAN unit (not shown), and a near field communication unit (not shown) according to a communication method, a transmission distance, and the type of transceived data. At least some of the digital content, the keywords in the request, and the thumbnail may be received through the transceiver 420.

Further, the storing unit 430 may store data including at least one of a current position of each of one or more electronic devices, a user schedule stored in the electronic device, digital content purchasing information, the number of times given digital content was reproduced, the number of times a given keyword was used in past requests, a title of digital content, meta data of digital content, a tag of digital content, and review information regarding the digital content. Further, the storing unit 430 may store a result of determination of a preference and a hobby of a user of an electronic device by receiving a keyword used in a search by each electronic device. Further, the storing unit 430 may store the number of times given digital content was downloaded, a user preference, a popularity order for each current field and genre, and a user condition preset by a user. Further, the storing unit 430 may store the image generated in response to the keyword received from at least one electronic device.

Figure 5:
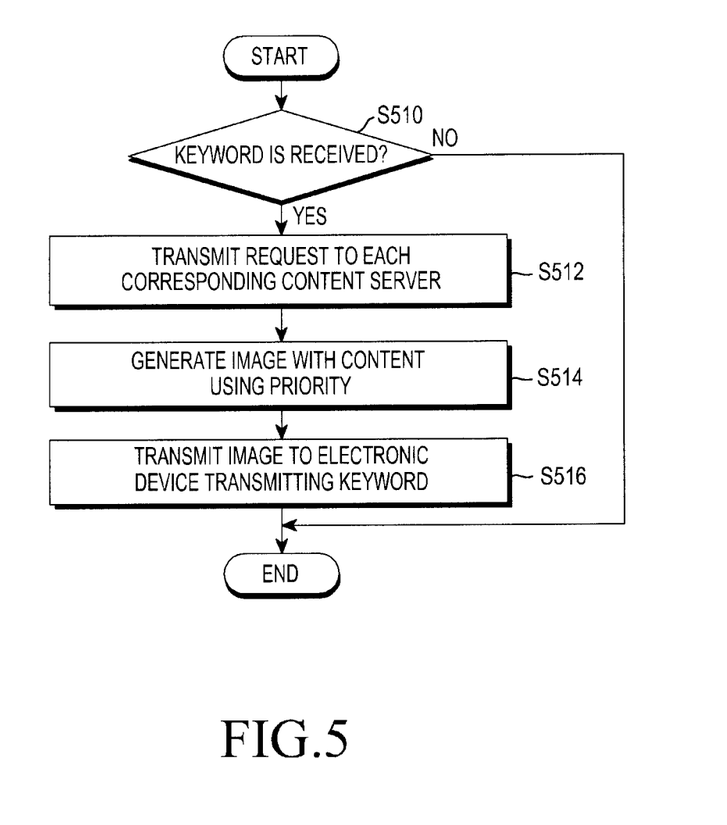
FIG. 5 is a flowchart illustrating an example method of providing content by the server in accordance with aspects of the present disclosure.

FIG. 5 is a flowchart illustrating a method of providing contents by the server according to another aspect of the present disclosure.

Hereinafter, a method of providing contents by the server according to another aspect of the present disclosure will be described in detail with reference to FIG. 5.

When a request comprising at least one keyword is received, the request may be transmitted to a corresponding content server (S510 and S512). In one example, server 400 may forward the request to a corresponding content server (not shown) in response to the receipt of the request. The server 400 may generate an image including one or more thumbnails, and receive digital content from a content server. Further, the server 400 may receive data including at least one of a current position of the electronic device, a user schedule stored in the electronic device, digital content purchase information, the number of times given digital content was reproduced, and the number of times a given keyword was received from the electronic device 200. The server may determine which digital content corresponds to at least one keyword in the request in view of the information included in the received data. The correlation may be determined in view of at least one of the received data, and at least one of a digital content title, meta-data of the digital content, a tag of the digital content, and review information regarding the digital content.

The content received from each of the content servers may generate an image by using a priority (S514). The server 400 may generate the image by using a priority of each of the thumbnails. The priority may be determined based on at least one of the number of times a given keyword was used in past requests, the number of times given digital content was downloaded, a user's preference, a popularity order, and a predetermined condition.

Further, the generated image may be transmitted to the electronic device transmitting the request comprising at least one keyword (S516). The server 400 may transmit the generated image to one or more other electronic devices, as well as the electronic device transmitting the request. The server 400 may transmit the composed image to another electronic device in response to the receipt of the same request from another electronic device. The server 400 may transmit the corresponding content to the electronic device in response to receiving content transmission request from the electronic device. When the request content is not found in the storing unit, the server 400 may forward the request to a corresponding content sever (not shown), and transmit the content received in response to the request to the electronic device.

Figure 6:
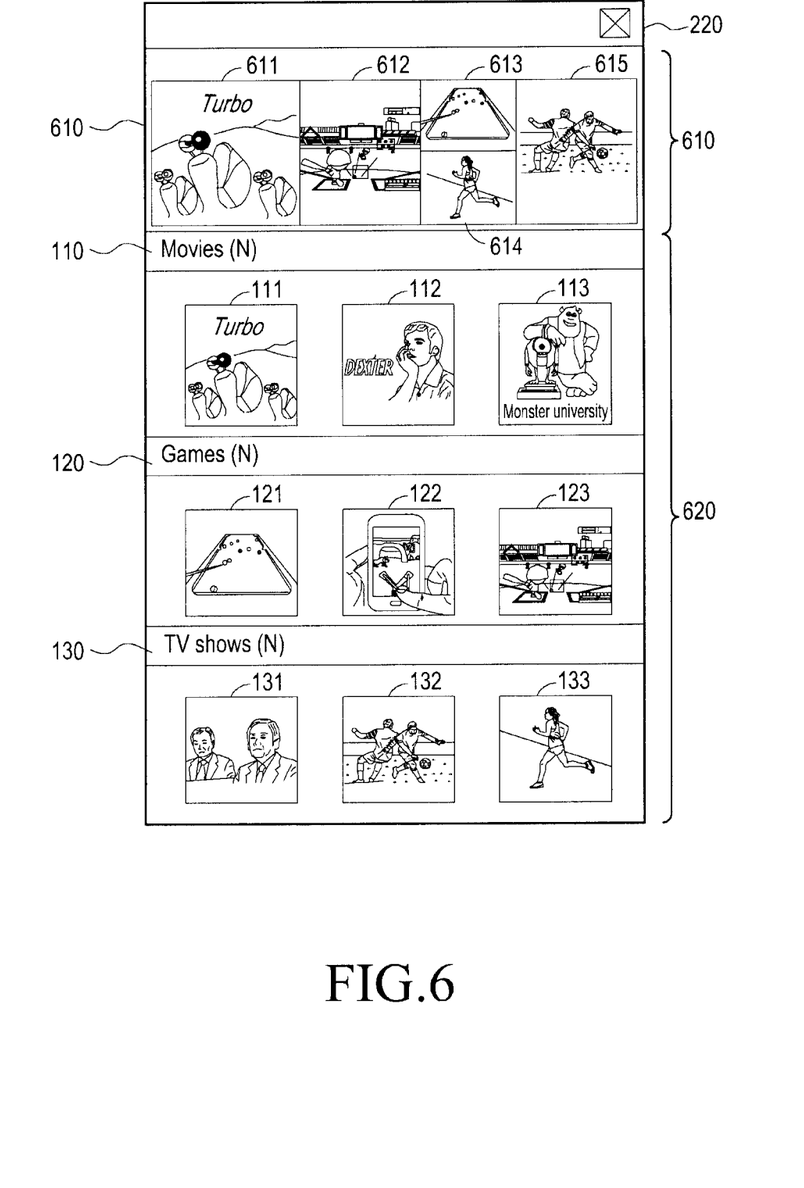
FIG. 6 is a diagram illustrating a working example in which an image includes at least one thumbnail in accordance with aspects of the present disclosure.

FIG. 6 is a diagram illustrating an example in which an image including at least one thumbnail according to an embodiment of the present disclosure is displayed on the screen.

As illustrated in FIG. 6, the controller 210 may divide the screen 220 into two or more regions. The controller 210 may display an image in first region 610 of the screen. The rendered image may contain thumbnails associated with digital content that correspond most with at least one keyword in the request. Controller 210 may display thumbnails received from the server in another region of the screen different from first region 610 such that each thumbnail in the other region is associated with digital content that does not correspond most with at least one keyword in the request. The thumbnails in these remaining regions 620 may be classified and displayed based on a category of the digital content. For example, in a case where the input keyword is "popularity order", thumbnails associated with content that are very popular in various fields, such as movies, games, and TV shows, are displayed on the second region 620 of the screen 220 for each of the various fields or for each category. As illustrated in FIG. 6, the category includes movies 110, games category 120, and TV shows 130. Further, the thumbnails of the movie category are displayed in an order of Turbo 111, DEXTER 112, and Monster University 113, and the thumbnails in the game category 120 are displayed in an order of billiards 121, a mobile game 122, and baseball 123. Further, the thumbnails of the TV shows 130 are displayed in an order of a debate 131, a soccer 132, and a race 133.

Further, the controller 210 may generate an image including thumbnails associated with digital content having the most correspondence with at least one keyword in the request and may display the generated image on the first region 610. In another example, the thumbnails displayed in the first region may be associated with digital content that are most popular for each category, or a thumbnail whose associated digital content corresponds most with the input keywords. The most popular content may have the highest priority. The correlation may be further determined based on at least one of a current position of the electronic device, a user's schedule stored in the electronic device, digital content purchasing information, the number of times given digital content was reproduced, the number of times a given keyword was used in past requests, a given title of digital content, meta data of digital content, a tag of digital content, and review information regarding digital content. A size or a position of each thumbnail included in the first region 610 may be adjusted or changed according to correlation and priority. For example, when the input keyword is "popularity order", the controller 210 may compose an image including thumbnails associated with content that is most popular for each category and may display the generated image on the first region 610. As illustrated, when the input keyword is "popularity order", Movies 611, Games 612, and Sports 613, 614, and 615, which are the thumbnails of the digital contents that corresponds most with at least one keyword in the request may be included in the first region 610. The popularity order may be one aspect of a priority. The thumbnails included in the first region 610 may be the same as or different from the thumbnails for each category included in the second region 620. For example, if the thumbnails in the second region 620 are different than those of the first region 610, then the thumbnails in the second region 620 may be associated with digital content that do not correspond most with at least one keyword in the request or that are not of the highest priority. Further, for example, when the input keyword is "HONG, Gil-dong", the controller may generate an image with a thumbnail (for example, a movie in which HONG, Gil-dong acts, a song written and composed by HONG, Gil-dong, a book written by HONG, Gil-dong, and a newspaper article related to HONG, Gil-dong) associated with digital content that corresponds most with the input keyword, and display the image on the first region 610.

Figure 7A:
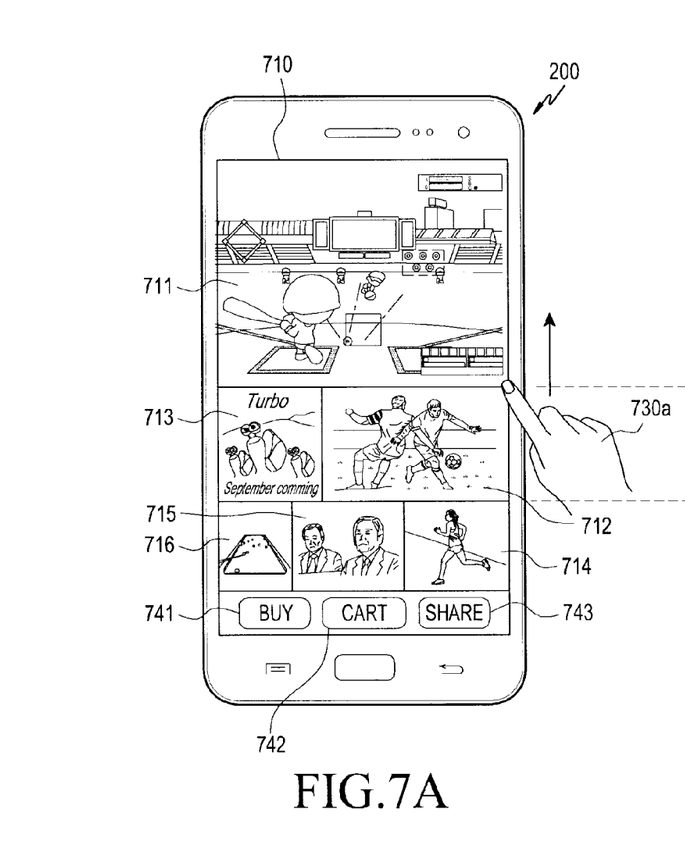
FIG. 7A is a diagram illustrating a working example in which a plurality of thumbnails in accordance with aspects of the present disclosure composes one image and are displayed on a screen.
Figure 7B:
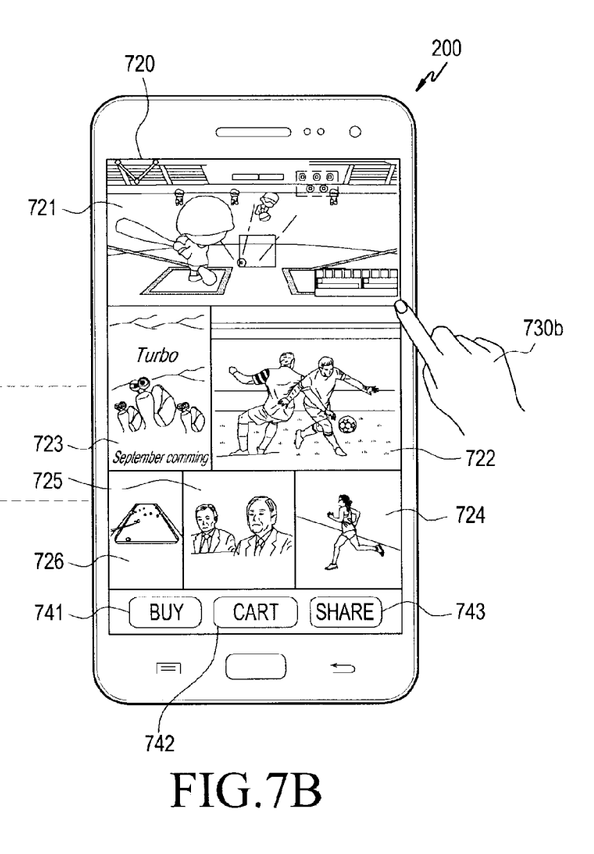
FIG. 7B is a diagram illustrating a working example in which a size of a plurality of thumbnails composing an image in accordance with aspects of the present disclosure is adjusted.

FIGS. 7A and 7B are diagrams illustrating examples of controlling sizes of a plurality of thumbnails included in the image according with aspects of the present disclosure.

Referring to FIGS. 7A and 7B, FIG. 7A is a diagram illustrating an example in which a plurality of thumbnails according to the embodiment of the present disclosure composes one image and are displayed on a screen; and FIG. 7B is a diagram illustrating an example in which a size of a plurality of thumbnails composing an image according to the embodiment of the present disclosure is adjusted.

Referring to FIG. 7A, a screen 710 of the electronic device 200 displays an image including a plurality of thumbnails. The image may include a plurality of thumbnails that highly correspond with a keyword input from a user. When the number of times a given keyword associated with a field or genre, such as sports or movies, transmitted by the user is high, the electronic device 200 may determine that the user has a lot of interest in that particular field or genre. According to such determination, the electronic device 200 may generate the image including one or more thumbnails highly corresponding with the input keyword and display the image on the screen. For example, the electronic device 200 may determine a field in which the user is interested through a field of the input keyword, the number of times the keyword was received in past requests, the type of downloaded content, a preference, a predetermined condition, a current position of the electronic device, a user's schedule, the number of times given digital content was reproduced, and the like. The determination may be performed through the input keyword or keywords. Further, for example, when the input keyword is the athlete "HONG, Gil-dong" and it is determined that the user has a lot of interest in sports and movies, but is not interested in current events, TV programs, or marathons, the electronic device may display a thumbnail 711 associated with content of the sport in which "HONG, Gil-dong" participates as the largest thumbnail. That is, the sport that most corresponds to the keyword in the request. Further, the electronic device may display a thumbnail 713 corresponding to digital content of a movie in which "HONG, Gil-dong" acts. The digital content associated with thumbnails 712 and 716 may correspond to soccer and billiards, which "HONG, Gil-dong" plays as a hobby. These thumbnails 712 and 716 may be smaller than thumbnail 711 that corresponds to sports digital content. Further, when "HONG, Gil-dong" participates in current events of lower interest to the user, the electronic device may display a small thumbnail 715 associated with the current event. Similarly, when the user has least interest in a field, such as a marathon, the electronic device may display thumbnail 714 corresponding to the marathon in which "HONG, Gil-dong" participates as the smallest thumbnail. At least one of a size and a position of each of the thumbnails 711 to 716 may be adjusted by a gesture of the user.

Referring to FIG. 7B, FIG. 7B is a diagram illustrating an example in which a size of an arbitrary thumbnail is reduced on the screen 710. When a gesture is input by the user, the electronic device 200 detects the input gesture and controls the thumbnail displayed on the screen 710. For example, when a gesture is input in an upper direction of the screen 710 by using a finger 730a and 730b, the electronic device 200 may reduce a size of a thumbnail corresponding to a point at which the gesture is detected to a size corresponding to a point at which the gesture is ended as illustrated in FIG. 7B. As described above, the size of the thumbnail 711 of FIG. 7A is adjusted to a size of a thumbnail 721 of FIG. 7B. Further, sizes of other thumbnails 712 to 716 of FIG. 7A may also be adjusted to sizes of thumbnails 722 to 726 of FIG. 7B in response to the adjustment of the size of the thumbnail 711. Further, the screen 710 or 720 may display buttons through which a user may use buy button 741 to purchase contents corresponding to one or more thumbnails, use button 742 to place contents corresponding to one or more thumbnail in a cart, and use share button 743 to share contents corresponding to one or more thumbnails with another user. Through the buttons 741 to 743, the user may buy his/her desired contents, put his/her desired contents in the cart in order to buy the contents later, or share his/her desired contents with another user through the displayed thumbnail. Further, when the selection (for example, buy, put in the cart, or share) is input from the user, the electronic device 200 may store the selection and apply the stored selection to contents having correlation in response to an input keyword later. Further, each of the thumbnails may be adjusted in a size and a position, and may be deleted by a command of the user. For example, when an arbitrary thumbnail is touched for a long time by the user, the electronic device 200 may display a pop-up window (not shown) including at least one function applicable to the corresponding thumbnail. The pop-up window may be different according to the type or a field of content corresponding to the thumbnail, and may include various functions, such as deletion, download, upload, share, and full-screen view.

It will be appreciated that the examples in the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It is appreciated that the storage unit included in the electronic device is one example of a program including commands for implementing various embodiments of the present disclosure or a machine-readable storage medium suitable for storing programs. Therefore, embodiments of the present disclosure provide a program including codes for implementing a system or method claimed in any claim of the accompanying claims and a machine-readable device for storing such a program.

Moreover, such a program as described above can be electronically transferred through an arbitrary medium such as a communication signal transferred through cable or wireless connection, and the present disclosure properly includes the things equivalent to that.

Further, the electronic device may receive the program from a program providing apparatus connected to the electronic device wirelessly or through a wire and store the received program. The program providing device may include a memory for storing a program including instructions so as for the electronic device to perform the method of controlling the screen and the method of providing the content, the screen controlling method, information necessary for the method of providing the content, a communication unit for performing wiredly or wireless communication with the electronic device, and a controller for transmitting a request of the electronic device or automatically transmitting a corresponding program to the portable device.

Meanwhile, although the examples of the present disclosure have been described in the detailed description of the present disclosure, various modifications can be made without departing from the scope of the present disclosure. Therefore, the scope of the present disclosure should not be limited to the aforementioned embodiments, but should be defined by the equivalents to the appended claims as well as the claims.

What is claimed is:

1. A method of controlling a screen of an electronic device, the method comprising:
   transmitting a request for digital content to a server;
   receiving, from the server, a plurality of thumbnails in response to the request, each of the plurality of thumbnails corresponding to a category of digital content based on at least one keyword in the request,
   displaying, in a first region of the screen, an image containing thumbnails associated with digital content corresponding most with the at least one keyword, among the received plurality of thumbnails; and
   displaying, in another region of the screen, thumbnails associated with digital content not corresponding most with the at least one keyword, among the received plurality of thumbnails,
   wherein the thumbnails in the another region are classified and displayed based on the category of the digital content.

2. The method of claim 1, wherein the thumbnails contained in the image further correspond to a priority such that the priority is based on at least one of a number of times a given keyword was used in the request, a number of times given digital content was downloaded, a preference of a user, a popularity order, and a predetermined condition.

3. The method of claim 1, further comprising:
   transmitting the displayed image to the server.

4. The method of claim 1, wherein the first region is a partial region or an entire region of the screen.

5. The method of claim 1, further comprising:
   determining whether a request to delete a given thumbnail included in the image is received; and
   inserting an arbitrary image into a position of the deleted thumbnail or inserting a succeeding thumbnail having priority in the position of the deleted thumbnail.

6. The method of claim 1, further comprising:
   determining whether each of the thumbnails in the first region is subjected to at least one of size adjustment, position movement, and deletion; and
   performing at least one of size adjustment and position movement of at least one other thumbnail, in response to at least one of the size adjustment, the position movement, and the deletion of each of the thumbnails.

7. The method of claim 1, further comprising:
   receiving a corresponding digital content in response to selection of an arbitrary thumbnail in the displayed image.

8. The method of claim 1, wherein each thumbnail in the image to be further associated with digital content that corresponds to at least one of a current position of the electronic device, a user schedule stored in the electronic device, digital content purchasing information, a number of times given digital content was reproduced, a number of times a given keyword was used in past requests, a title of digital content, meta data of digital content, a tag of digital content, and review information regarding digital content.

9. A non-transitory computer-readable medium storing instructions that, when executed, cause at least one processor to perform the method of claim 1.

10. The method of claim 1, further comprising:
    adjusting the size of a thumbnail in response to a hover input.

11. An electronic device for controlling a screen, the electronic device comprising:
    a communication unit configured to transmit a request for digital content to a server and to receive, from the server, a plurality of thumbnails corresponding to a category of digital content based on at least one keyword in the request; and
    a controller configured to:
      display, in a first region of the screen, an image containing thumbnails associated with digital content corresponding most with the at least one keyword, among the received plurality of thumbnails, and
      display, in another region of the screen, thumbnails associated with digital content not corresponding most with at least one keyword, among the received plurality of thumbnails, wherein the thumbnails in the another region are classified and displayed based on the category of the digital content.

12. The electronic device of claim 11, wherein the communication unit is further configured to transmit data to the server such that the data includes at least one of a current position of the electronic device, a user schedule stored in the electronic device, digital content purchasing information, a number of times given digital content was reproduced, and a number of times a given keyword was transmitted to the server, each thumbnail received from the server to be associated with digital content at least partially corresponding to the transmitted data.

13. The electronic device of claim 11, wherein the controller is further configured to classify thumbnails associated with digital content not corresponding most or with digital content not having a highest priority in another region of the screen different from the first region, and
wherein the priority is based on at least one of a number of times a given keyword was used in past requests, a number of times given digital content was downloaded, a preference of a user, a popularity order, and a predetermined condition.

14. The electronic device of claim 11, wherein the controller is further configured to insert an arbitrary image into a position of a given thumbnail deleted from the image or to move a succeeding thumbnail having priority in the position of the thumbnail deleted from the image.

15. The electronic device of claim 11, wherein the controller is further configured to determine whether each of the thumbnails in the first region is subjected to at least one of size adjustment, position movement and deletion, and performs at least one of size adjustment and position movement of at least one other thumbnail, in response to at least one of the size adjustment, the position movement, and the deletion of each of the thumbnails.

16. The electronic device of claim 11, wherein the communication unit is further configured to receive a corresponding digital content in response to selection of an arbitrary thumbnail in the displayed image.

17. The electronic device of claim 11, wherein the controller is further configured to adjust a size of a thumbnail in response to a hover input.

18. A method of providing digital content, the method comprising:
receiving a request for digital content from an electronic device;
obtaining a plurality of thumbnails, each of the plurality of thumbnails corresponding to a category of digital content based on at least one keyword in the request;
arranging the thumbnails into an image containing thumbnails associated with digital content corresponding most with the at least one keyword, among the obtained plurality of thumbnails; and
transmitting the arranged image and thumbnails associated with digital content not corresponding most with the at least one keyword, among the obtained plurality of thumbnails,
wherein said thumbnails are classified to be displayed based on the category of the digital content.

19. The method of claim 18, further comprising:
analyzing data received from the electronic device in which the data includes at least one of a current position of the electronic device, a user schedule stored in the electronic device, digital content purchasing information, a number of times given digital content was reproduced, and a number of times a given keyword was sent to the electronic device,
wherein the thumbnails are further associated with digital content that correspond to at least one of the received data, and at least one of a digital content title, meta data of the digital content, a tag of the digital content, and review information regarding the digital content.

20. The method of claim 18, wherein the thumbnails arranged in the image are further associated with digital content with a highest priority such that the priority is based on at least on one of a number of times a given keyword was used in past requests, a number of times given digital content was downloaded, a user preference, a popularity order, and a predetermined condition.

21. The method of claim 18, further comprising:
transmitting the arranged image to another electronic device in response to receipt of the request from the another electronic device.

22. The method of claim 18, further comprising:
requesting transmission of the digital content to a corresponding content server, if the digital content requested by the electronic device is not found.

23. A non-transitory computer-readable medium storing instructions that, when executed, cause at least one processor to perform the method of claim 18.

24. A server for providing a content, the server comprising:
a transceiver configured to receive a request for digital content from an electronic device, and to obtain a plurality of thumbnails, each of the plurality of thumbnails corresponding to a category of digital content based on at least one keyword in the request; and
a controller configured to:
arrange the thumbnails into an image containing thumbnails associated with digital content corresponding most with the at least one keyword, among the obtained plurality of thumbnails, and
transmit the arranged image and thumbnails associated with digital content not corresponding most with the at least one keyword, among the obtained plurality of thumbnails,
wherein said thumbnails are classified to be displayed based on the category of the digital content.

25. The saver of claim 24, wherein the controller is further configured to determine the correspondence based on at least one of a current position of the electronic device, a user schedule stored in the electronic device, digital content purchasing information, a number of times given digital content was reproduced, and a number of times a given keyword was received from the electronic device.

26. The server of claim 24, wherein the controller is further configured to arrange the thumbnails in the image based on a priority of digital content associated with each thumbnail such that the priority is based on at least one of a number of times a given keyword was received, a number of times given digital content was downloaded, a user preference, a popularity order, and a predetermined condition.

27. The server of claim 24, wherein the controller is further configured to transmit the image to another electronic device in response to receipt of the request from the another electronic device.

* * * * *